United States Patent
He

(10) Patent No.: US 10,972,917 B2
(45) Date of Patent: Apr. 6, 2021

(54) SIGNALING ATTACK PREVENTION METHOD AND APPARATUS

(71) Applicant: Huawei Technologies Co., Ltd., Shenzhen (CN)

(72) Inventor: Chengdong He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/289,106

(22) Filed: Feb. 28, 2019

(65) Prior Publication Data
US 2019/0200233 A1 Jun. 27, 2019

Related U.S. Application Data

(63) Continuation of application No. PCT/CN2017/080347, filed on Apr. 13, 2017.

(30) Foreign Application Priority Data

Aug. 31, 2016 (CN) .......................... 201610796869.0

(51) Int. Cl.
*H04W 12/12* (2021.01)
*H04L 29/06* (2006.01)
(Continued)

(52) U.S. Cl.
CPC ..... *H04W 12/1204* (2019.01); *H04L 63/0876* (2013.01); *H04L 63/126* (2013.01);
(Continued)

(58) Field of Classification Search
CPC ........... H04L 2463/142; H04L 63/0876; H04L 63/126; H04L 63/1458; H04L 63/1466;
(Continued)

(56) References Cited

U.S. PATENT DOCUMENTS

2003/0081607 A1\* 5/2003 Kavanagh ........... H04L 63/0227 370/392
2013/0148510 A1\* 6/2013 Kang .................. H04L 63/1441 370/242
(Continued)

FOREIGN PATENT DOCUMENTS

CN 101163264 A 4/2008
CN 101888635 A 11/2010
(Continued)

OTHER PUBLICATIONS

"3rd Generation Partnership Project; Technical Specification Group Core Networking and Terminals; 3GPP Evolved Jacket System (EPS); Evolved General Packet Radio Service (GPRS) Tunnelling Protocol for Control plane (GTPv2-C) Stage 3 (Release 8)," 3GPP TS 29.274, V8.0.0, XP050372751, Technical Specification, Dec. 2008, 111 pages.

(Continued)

*Primary Examiner* — Steven H Nguyen
(74) *Attorney, Agent, or Firm* — Conley Rose, P.C.

(57) ABSTRACT

A signaling attack prevention method and apparatus, where the method includes receiving a general packet radio service (GPRS) Tunneling Protocol (GTP-C) message from a serving gateway (SGW), determining whether the GTP-C message is received from an eighth data interface (S8), determining whether a first characteristic parameter of the GTP-C message is valid when the GTP-C message is received from the S8 interface, where the first characteristic parameter includes at least one of an international mobile subscriber identity (IMSI) of a user, or an identifier of a message source end of the GTP-C message, and discarding the GTP-C message or returning, to the SGW, a GTP-C response message carrying an error code cause value when the first characteristic parameter of the GTP-C message is invalid.

12 Claims, 5 Drawing Sheets

(51) Int. Cl.
*H04W 76/12* (2018.01)
*H04W 76/11* (2018.01)
*H04W 8/04* (2009.01)
*H04W 8/08* (2009.01)
*H04W 12/00* (2021.01)
*H04W 84/04* (2009.01)

(52) U.S. Cl.
CPC ...... *H04L 63/1458* (2013.01); *H04L 63/1466* (2013.01); *H04W 8/04* (2013.01); *H04W 8/08* (2013.01); *H04W 76/11* (2018.02); *H04W 76/12* (2018.02); *H04L 2463/142* (2013.01); *H04W 12/00514* (2019.01); *H04W 84/042* (2013.01)

(58) Field of Classification Search
CPC . H04W 12/1204; H04W 76/11; H04W 76/12; H04W 84/042; H04W 8/04; H04W 8/08; H04W 12/00514
See application file for complete search history.

(56) References Cited

U.S. PATENT DOCUMENTS

| | | | |
|---|---|---|---|
| 2014/0140321 A1 | 5/2014 | Janakiraman et al. | |
| 2014/0254368 A1* | 9/2014 | Zhang | H04L 47/6275 370/235 |
| 2016/0285762 A1 | 9/2016 | Chen et al. | |
| 2016/0373352 A1* | 12/2016 | Sharma | H04L 47/125 |
| 2017/0237632 A1* | 8/2017 | Hegde | H04L 47/125 370/252 |
| 2017/0237633 A1* | 8/2017 | Hegde | H04J 11/00 370/252 |
| 2018/0063724 A1 | 3/2018 | Zhang et al. | |

FOREIGN PATENT DOCUMENTS

| | | |
|---|---|---|
| CN | 101997836 A | 3/2011 |
| CN | 102638442 A | 8/2012 |
| CN | 104427483 A | 3/2015 |
| WO | 2014009439 A1 | 1/2014 |

OTHER PUBLICATIONS

Kotte, B., "Analysis and Experimental Verification of Diameter Attacks in Long Term Evolution Networks," Dec. 2008, XP055434736, 72 pages.
Foreign Communication From a Counterpart Application, European Application No. 17844873.4, Extended European Search Report dated Jul. 4, 2019, 9 pages.
Machine Translation and Abstract of Chinese Publication No. CN101163264, Apr. 16, 2008, 13 pages.
Machine Translation and Abstract of Chinese Publication No. CN101888635, Nov. 17, 2010, 12 pages.
Machine Translation and Abstract of Chinese Publication No. CN102638442, Aug. 15, 2012, 29 pages.
Machine Translation and Abstract of Chinese Publication No. CN104427483, Mar. 18, 2015, 14 pages.
"3rd Generation Partnership Project; Technical Specification Group Services and System Aspects; 3G security; Network Domain Security (NDS); IP network layer security (Release 13)," 3GPP TS 33.210, V13.0.0, Dec. 2015, 24 pages.
Foreign Communication From a Counterpart Application, PCT Application No. PCT/CN2017/080347, English Translation of International Search Report dated Jun. 30, 2017, 2 pages.
Foreign Communication From a Counterpart Application, PCT Application No. PCT/CN2017/080347, English Translation of Written Opinion dated Jun. 30, 2017, 4 pages.

\* cited by examiner

S8 interface protocol stack

SIGNALING ATTACK PREVENTION METHOD AND APPARATUS

CROSS-REFERENCE TO RELATED APPLICATIONS

This application is a continuation of International Patent Application No. PCT/CN2017/080347 filed on Apr. 13, 2017, which claims priority to Chinese Patent Application No. 201610796869.0 filed on Aug. 31, 2016. The disclosures of the aforementioned applications are hereby incorporated by reference in their entireties.

TECHNICAL FIELD

The present disclosure relates to the communications field, and further, to a signaling attack prevention method and apparatus.

BACKGROUND

Both a serving gateway (SGW) and a public data network gateway (PGW) are important network elements in a mobile communications network. The SGW is responsible for a data plane function such as user data forwarding. The PGW provides functions such as user session management and bearer control, data forwarding, Internet Protocol (IP) address assignment, and non-3rd Generation Partnership Project (3GPP) user access.

In a network in the 4th generation mobile communication technology (4G), the SGW and the PGW communicate with each other based on a fifth data interface (S5) or an eighth data interface (S8) defined in the GTP-C protocol in the general packet radio service (GPRS) Tunneling Protocol (GTP). When the SGW and the PGW belong to a same operator, the SGW and the PGW communicate with each other using the S5 interface, and in this case, the communication is secure. However, when the SGW and the PGW belong to different operators, the SGW and the PGW communicate with each other using the S8 interface, and in this case, a hacker may attack the PGW using the SGW, resulting in a communication security risk.

SUMMARY

Embodiments of the present disclosure provide a signaling attack prevention method and apparatus to prevent a GTP-C signaling attack and improve communication security.

According to a first aspect, an embodiment of the present disclosure provides a signaling attack prevention method. The method includes receiving, by a PGW or an edge node, a GTP-C message sent by an SGW, determining, by the PGW or the edge node, whether the GTP-C message is received from an S8 interface, when the GTP-C message is received from the S8 interface, determining, by the PGW or the edge node, whether a first characteristic parameter of the GTP-C message is valid, where the first characteristic parameter includes at least one of the following parameters an international mobile subscriber identity (IMSI) of a user, or an identifier (also referred to as ID) of a message source end of the GTP-C message, and when the first characteristic parameter of the GTP-C message is invalid, discarding, by the PGW or the edge node, the GTP-C message or returning, to the SGW, a GTP-C response message carrying an error code cause value.

In the solution provided in this embodiment of the present disclosure, validity of each parameter in the GTP-C message is determined, and when each characteristic parameter is invalid, the GTP-C message is discarded or the GTP-C response message carrying the error code cause value is returned to the SGW such that a hacker can be effectively prevented from attacking the SGW using each attack path, and communication security is improved.

In an example, the IMSI is carried in the GTP-C message or is obtained using a tunnel endpoint identifier (TEID) carried in the GTP-C message. Because the GTP-C message may carry the IMSI or may carry the TEID, when the GTP-C message carries the TEID, the IMSI may be found using the TEID.

In a possible design, the GTP-C message further includes a source IP address of the SGW, and the determining, by the PGW or the edge node, whether the GTP-C message is received from an S8 interface includes determining whether the source IP address and an IP address of the PGW or the edge node that receives the GTP-C message belong to a same network segment, and when the source IP address and the IP address of the PGW or the edge node that receives the GTP-C message do not belong to a same network segment, determining, by the PGW or the edge node, that the GTP-C message is received from the S8 interface, or determining, by the PGW or the edge node, whether the source IP address belongs to an IP address set authorized by an operator to which the PGW or the edge node belongs, and when the source IP address does not belong to the IP address set authorized by the operator to which the PGW or the edge node belongs, determining, by the PGW or the edge node, that the GTP-C message is received from the S8 interface.

In the solution provided in this embodiment of the present disclosure, by means of determining whether the GTP-C message is received from the S8 interface, attack prevention processing may be performed only on the GTP-C received by the PGW or the edge node from the S8 interface such that attack prevention efficiency is improved.

In a possible design, the GTP-C message further includes the source IP address of the SGW, the first characteristic parameter includes the identifier of the message source end of the GTP-C message, and determining, by the PGW or the edge node, whether a first characteristic parameter of the GTP-C message is valid includes determining, by the PGW or the edge node, whether the source IP address belongs to a preset IP address set, and when the source IP address does not belong to the preset IP address set, determining, by the PGW or the edge node, that the identifier is not a valid identifier, or sending, by the PGW or the edge node, the source IP address to a home subscriber server (HSS) and/or a mobility management entity (MME) such that the MME and/or the HSS determine/determines whether the source IP address belongs to a preset IP address set, receiving, by the PGW or the edge node, a home operator determining result returned by the MME and/or the HSS, and when the home operator result is that the IP address does not belong to the preset IP address set, determining, by the PGW or the edge node, that the identifier of the message source end is not a valid identifier. By means of presetting a valid IP address set in the PGW, the edge node, the MME, or the HSS, and determining whether the source IP address in the GTP-C message is in the IP address set, the hacker can be further prevented from launching a signaling attack on the SGW by forging the IP address in the GTP-C message, and communication security is improved.

In a possible design, the GTP-C message further includes a public land mobile network (PLMN) ID of the SGW, the first characteristic parameter includes the identifier of the message source end of the GTP-C message, and determining, by the PGW or the edge node, whether a first characteristic parameter of the GTP-C message is valid includes determining whether the PLMN ID belongs to a preset PLMN ID set, and when the PLMN ID does not belong to the preset PLMN ID set, determining, by the PGW or the edge node, that an identifier of the GTP-C message is an invalid identifier, or sending, by the PGW or the edge node, the PLMN ID to the HSS and/or the MME such that the MME and/or the HSS determine/determines whether the PLMN ID belongs to a preset PLMN ID set, receiving, by the PGW or the edge node, a home operator determining result returned by the MME and/or the HSS, and when the home operator result is that the PLMN ID does not belong to the preset PLMN ID set, determining, by the PGW or the edge node, that the identifier is an invalid identifier. By means of presetting a valid PLMN ID set in the PGW, the edge node, the MME, or the HSS, and determining whether the source IP address in the GTP-C message is in the IP address set, the hacker can be further prevented from launching a signaling attack on the SGW by forging the IP address in the GTP-C message, and communication security is improved.

In a possible design, the GTP-C message further includes the PLMN ID, the first characteristic parameter is the identifier of the message source end of the GTP-C message, and determining, by the PGW or the edge node, whether a first characteristic parameter of the GTP-C message is valid includes determining, by the PGW or the edge node, whether the IP address belongs to the preset IP address set and determining whether the PLMN ID belongs to the preset PLMN ID set, and when the source IP address does not belong to the preset IP address set and/or the PLMN ID belongs to the preset PLMN ID set, determining, by the PGW or the edge node, that the identifier is an invalid identifier, or sending, by the PGW or the edge node, the source IP address and the PLMN ID to the HSS such that the HSS determines whether the IP address belongs to the preset IP address set and/or determines whether the PLMN ID belongs to the preset PLMN ID set, receiving, by the PGW or the edge node, a home operator determining result returned by the MME and/or the HSS, and when the home operator determining result is that the source IP address does not belong to the preset IP address set and/or the PLMN ID does not belong to the preset PLMN ID set, determining, by the PGW or the edge node, that the identifier is an invalid identifier, or sending, by the PGW or the edge node, the source IP address and the PLMN ID to the MME such that the HSS determines whether the IP address belongs to the preset IP address set and/or determines whether the PLMN ID belongs to the preset PLMN ID set, receiving, by the PGW or the edge node, a home operator determining result returned by the MME and/or the HSS, and when the home operator determining result is that the source IP address does not belong to the preset IP address set and/or the PLMN ID does not belong to the preset PLMN ID set, determining, by the PGW or the edge node, that the identifier is an invalid identifier. Validity of the GTP-C message source end is more accurately determined using both the source IP address and the PLMN ID such that communication security is improved.

In a possible design, the first characteristic parameter includes the IMSI, and the determining, by the PGW or the edge node, whether a first characteristic parameter of the GTP-C message is valid includes determining, by the PGW or the edge node, whether the IMSI is an IMSI authorized by the operator to which the PGW belongs, and when the IMSI is not the IMSI authorized by the operator to which the PGW belongs, determining, by the PGW or the edge node, that the IMSI in the GTP-C message is an invalid IMSI. Because the IMSI is an identity of a terminal user that sends the GTP-C message using the SGW, that is, a message resource that sends the GTP-C message, whether the GTP-C is sent by a valid terminal user can be accurately determined using the IMSI in the GTP-C message to determine validity of the GTP-C message in order to prevent the hacker from launching a malicious attack using GTP-C signaling, and improve communication security.

In a possible design, the first characteristic parameter includes the IMSI, and determining, by the PGW or the edge node, whether a first characteristic parameter of the GTP-C message is valid includes determining, by the PGW or the edge node, whether the IMSI has a roaming access permission, and when the IMSI has no roaming access permission, determining, by the PGW or the edge node, that the IMSI in the GTP-C message is an invalid IMSI. Whether the GTP-C message is valid is determined by further determining whether the IMSI has the roaming access permission in order to further prevent a GTP-C signaling attack, and improve communication security.

In a possible design, determining, by the PGW or the edge node, whether the IMSI has a roaming access permission further includes storing, in the PGW or the edge node, a preset set of IMSIs of users having the roaming access permission, determining, by the PGW or the edge node, whether the IMSI belongs to the preset set of the IMSIs of the users having the roaming access permission, and when the IMSI does not belong to the preset set of the IMSIs of the users having the roaming access permission, determining, by the PGW or the edge node, that the IMSI in the GTP-C message is an invalid IMSI, or sending, by the PGW or the edge node, a roaming access permission determining request to the HSS such that the HSS determines whether the IMSI belongs to a preset set of IMSIs of users having the roaming access permission, receiving, by the PGW or the edge node, a roaming access permission determining result returned by the HSS, and when the roaming access permission determining result is that the IMSI does not belong to the preset set of the IMSIs of the users having the roaming access permission, determining, by the PGW or the edge node, that the IMSI in the GTP-C message is an invalid IMSI, or sending, by the PGW or the edge node, a roaming access permission determining request to the MME such that the MME determines whether the IMSI belongs to a preset set of IMSIs of users having the roaming access permission, receiving, by the PGW or the edge node, a roaming access permission determining result returned by the MME, and when the roaming access permission determining result is that the IMSI does not belong to the preset set of the IMSIs of the users having the roaming access permission, determining, by the PGW or the edge node, that the IMSI in the GTP-C message is an invalid IMSI. Whether the GTP-C message is valid may be determined by determining whether the IMSI in the GTP-C message is in the set of the IMSIs of the users having the roaming access permission in order to further prevent a GTP-C signaling attack, and improve communication security.

In a possible design, the GTP-C message includes a second characteristic parameter, and the method further includes determining, by the PGW or the edge node, whether the second characteristic parameter is consistent with a second characteristic parameter carried in a create session request create session request message received before a terminal corresponding to the GTP-C message is attached, and when the second characteristic parameter is inconsistent with the second characteristic parameter carried in the create session request message received before the terminal corresponding to the GTP-C message is attached, determining, by the PGW or the edge node, that the GTP-C message is invalid, where the second characteristic parameter includes at least one of the following parameters, the source IP address, or a TEID. By means of further determining consistency between the identity of the terminal user of the GTP-C message and an operator to which the terminal belongs, validity of the GTP-C message may be further determined, and communication security may be ensured.

In an example, before the determining, by the PGW or the edge node, whether the second characteristic parameter is consistent with a second characteristic parameter carried in a create session request create session request message received before a terminal is attached, the method further includes determining, by the PGW or the edge node, whether the terminal is attached, and when the terminal is attached, performing, by the PGW or the edge node, the step of determining whether the second characteristic parameter is consistent with a second characteristic parameter carried in a create session request create session request message received before the terminal is attached, or when the terminal is not attached, performing, by the PGW or the edge node, the step of determining whether the IMSI belongs to a preset set of IMSIs of users having the roaming access permission. A step performed when the terminal is attached is different from a step performed when the terminal is not attached such that a GTP-C message determining procedure is more comprehensive, and a signaling attack is more effectively prevented.

According to a second aspect, an embodiment of the present disclosure provides a signaling attack prevention apparatus. The signaling attack prevention apparatus has a function of implementing the first aspect, and the function may be implemented using hardware, or may be implemented using hardware to execute corresponding software. The hardware or the software includes one or more modules corresponding to the foregoing function.

In a possible design, the signaling attack prevention apparatus may include a PGW.

In a possible design, the signaling attack prevention apparatus may include an edge node.

According to a third aspect, an embodiment of the present disclosure provides a signaling attack prevention apparatus. The signaling attack prevention apparatus includes a processor, a receiver, and a transmitter. The processor is configured to support a terminal in executing a corresponding function in the foregoing method. The receiver and the transmitter are configured to support the signaling attack prevention apparatus in communicating with a PGW. Further, a relay device may further include a memory, the memory is configured to couple with the processor, and the memory stores a program instruction and data that are necessary to the terminal.

According to a fourth aspect, an embodiment of the present disclosure provides a computer storage medium configured to store a computer software instruction used by the signaling attack prevention apparatus in the second aspect, and the computer storage medium includes a program designed for executing the foregoing aspect.

In comparison with the prior art, in the solutions provided in the embodiments of the present disclosure, after the PGW or the edge node receives the GTP-C message sent by the SGW, whether the characteristic parameter carried in the GTP-C message is valid is determined when the GTP-C message is received from the S8 interface, and the GTP-C message is discarded or the GTP-C response message carrying the error code cause value is returned to the SGW when the characteristic parameter is invalid such that a hacker can be effectively prevented from attacking the PGW using each attack path, and communication security is improved.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Embodiments of the present disclosure provide a signaling attack prevention method and apparatus, to prevent a GTP-C signaling attack and improve communication security.

To make persons skilled in the art better understand the technical solutions in the present disclosure, the following clearly describes the technical solutions in the embodiments of the present disclosure with reference to the accompanying drawings in the embodiments of the present disclosure. The described embodiments are merely some of rather than all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first," "second," "third," and so on are intended to distinguish between different objects but do not indicate a particular order. In addition, the terms "including" or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
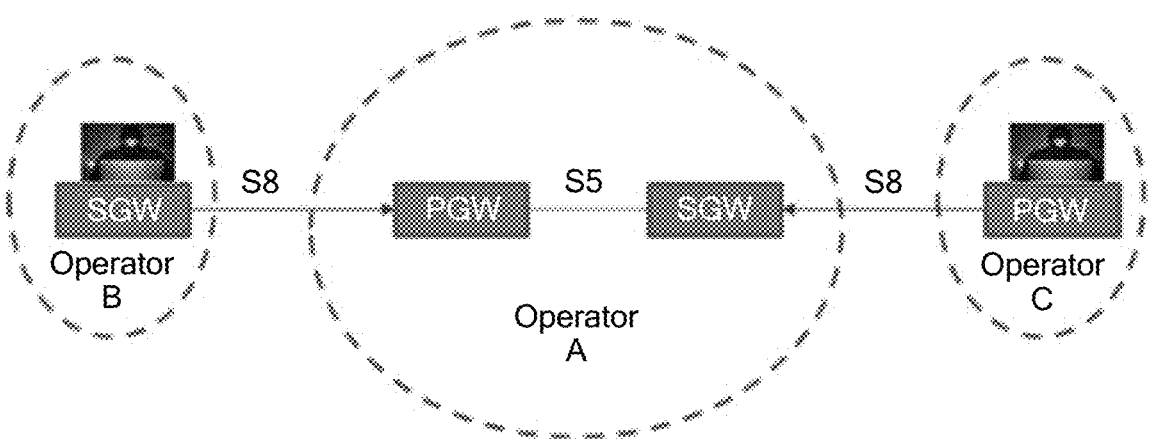
FIG. 1 is a diagram of a network architecture used for communication between an SGW and a PGW according to an embodiment of the present disclosure.

Referring to FIG. 1, FIG. 1 is a diagram of a network architecture used for communication between an SGW and a PGW according to an embodiment of the present disclosure. As shown in FIG. 1, when an SGW and a PGW belong to a same operator, an interface between the SGW and the PGW is referred to as an S5 interface. When the SGW and the PGW belong to different operators, an interface between the SGW and the PGW is referred to as an S8 interface.

In this embodiment of the present disclosure, if the SGW and the PGW communicate with each other using the S8 interface, the following conditions need to be met. 1. An operator to which the SGW belongs and an operator to which the PGW belongs need to sign a roaming agreement. 2. An IMSI in a message sent by the SGW to the PGW needs to belong to the operator to which the PGW belongs, and the user has a roaming access permission in a network of the operator to which the SGW belongs.

When the SGW and the PGW belong to different operators, in this case, the SGW and the PGW belong to different security domains. Therefore, a peer network element may be attacked using the S8 interface.

Figure 2:
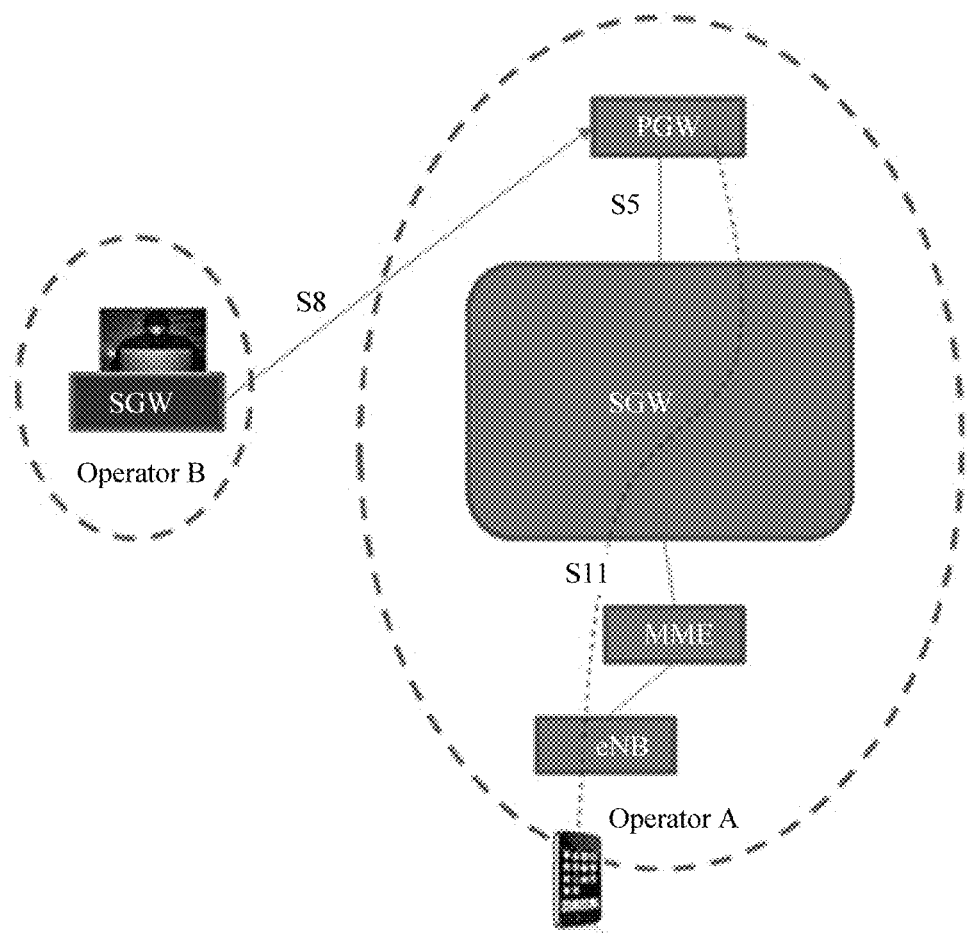
FIG. 2 is a schematic diagram of a signaling attack according to an embodiment of the present disclosure.

Referring to FIG. 2, FIG. 2 is a schematic diagram of a signaling attack according to an embodiment of the present disclosure. In a network architecture shown in FIG. 2, a PGW of an operator B may attack an SGW of an operator A using an S8 interface as described below.

1. An attack path 1: A hacker uses the SGW of the operator B to send a create session request message to the PGW of the operator A using the S8 interface, an IMSI parameter is filled in randomly, and the PGW assigns an IP address to a corresponding IMSI.

Consequently, a security risk 1 may be caused: A central processing unit (CPU)/memory resource of the PGW is consumed, and a denial-of-service (DOS) attack is caused. Alternatively, an IP address pool of the PGW is consumed and is not released such that when the address pool is depleted, an IP address cannot be assigned to a common user, and a network cannot be accessed.

2. An attack path 2: A hacker uses the SGW of the operator B to send a create session request message to the PGW of the operator A using the S8 interface, and an IMSI parameter is an IMSI of an attached UE. Consequently, a security risk 2 is caused: As a terminal is forced to exit a network, the terminal cannot access a network service.

3. An attack path 3: A hacker uses the SGW of the operator B to send a modify bearer request message to the PGW of the operator A using the S8 interface, an IMSI parameter is an IMSI of an attached user terminal, and the PGW returns a response message to indicate that bearer modification succeeds. Consequently, a security risk 3 may be caused: Data of the terminal on a user plane downlink (PGW→SGW) is hijacked to a machine of an attacker, resulting in user privacy leakage.

Figure 3:
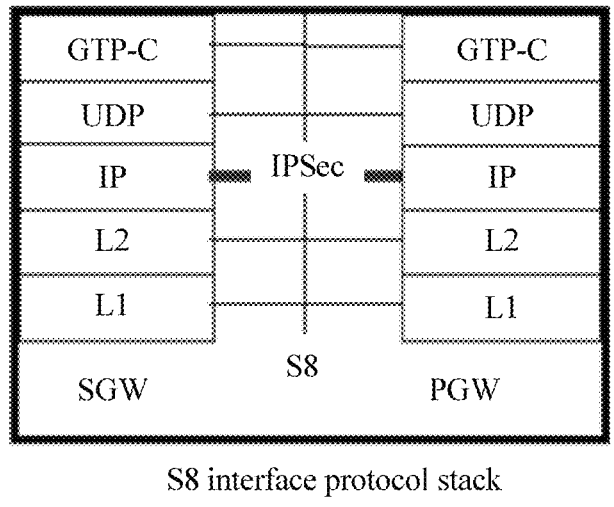
FIG. 3 is a diagram of an S8 interface protocol stack according to an embodiment of the present disclosure.

In this embodiment of the present disclosure, to ensure signaling security on the S8 interface, the IP Security (IPSec) is deployed for the S8 interface to protect GTP-C signaling security on the S8 interface, for example, identity authentication between the SGW and the PGW, and integrity and confidentiality of data above an IP layer. Referring to FIG. 3, FIG. 3 is a diagram of an S8 interface protocol stack according to an embodiment of the present disclosure. However, because all the foregoing three attacks belong to attacks in a GTP-C signaling plane above the IP layer, even if the identity authentication between the PGW and the SGW succeeds, and the integrity and the confidentiality of the data above the IP layer are ensured, the attacker may still launch an attack by sending normal GTP-C signaling. Therefore, a conventional IPSec mechanism cannot prevent such an attack, and protection for an application plane (such as a GTP-C plane) above the IP layer needs to be considered.

Figure 4:
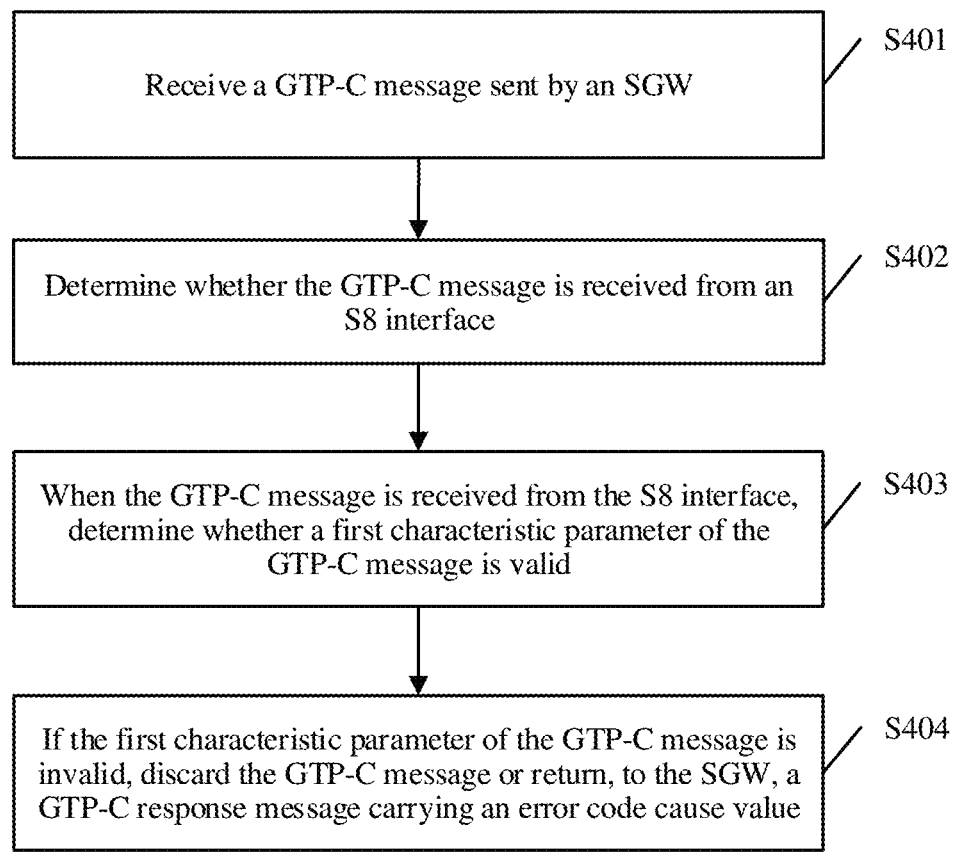
FIG. 4 is a schematic flowchart of a signaling attack prevention method according to an embodiment of the present disclosure.

Referring to FIG. 4, FIG. 4 is a schematic flowchart of a signaling attack prevention method according to an embodiment of the present disclosure. As shown in FIG. 4, the method may include the following steps.

Step S401. Receive a GTP-C message sent by an SGW.

In this embodiment of the present disclosure, the GTP-C message sent by the SGW may be received by a PGW, or the GTP-C message sent by the SGW may be received by an edge node (GTP-C aware).

Optionally, the edge node may be a firewall that is deployed at a border of an operator network and that is aware of the GTP-C Protocol.

Further, in this embodiment of the present disclosure, the GTP-C message may be a create session request (IMSI, . . . ), a modify bearer request (serving network, . . . ), a delete session request (TEID, . . . ) message, or the like.

Optionally, the GTP-C message includes at least one of the following items a source IP address of the SGW, a PLMN ID of the SGW, or an IMSI of a user.

Step S402. Determine whether the GTP-C message is received from an S8 interface.

In this embodiment of the present disclosure, when attacking a PGW of an operator A using an SGW of an operator B, a hacker sends a GTP-C attack message using the S8 interface. Therefore, to prevent the foregoing attacks, only validity of the GTP-C message received from the S8 interface needs to be determined, and security of a message received from an S5 interface or another security interface does not need to be determined.

Optionally, the GTP-C message further includes a source IP address of the SGW.

The determining whether the GTP-C message is received from an S8 interface includes determining whether the source IP address and an IP address of a PGW or an edge node that receives the GTP-C message belong to a same network segment, and when the source IP address and the IP address of the PGW or the edge node that receives the GTP-C message do not belong to a same network segment, determining that the GTP-C message is received from the S8 interface, or determining whether the source IP address belongs to an IP address set authorized by an operator to which the PGW or an edge node belongs, and when the source IP address does not belong to the IP address set authorized by the operator to which the PGW or the edge node belongs, determining that the GTP-C message is received from the S8 interface.

Further, the IP address set may be stored in the PGW or the edge node.

For example, in an example of the present disclosure, if the SGW belongs to the operator B, the IP address set is a set of all IP addresses supported by the operator B.

Further, the IP address set may be all independent IP addresses such as an IP address 192.168.6.28 and an IP address 192.168.6.78, or may be an IP address segment, for example, 192.168.6.0 is used to indicate an IP address segment from 192.168.6.0 to 192.168.6.255.

It may be understood that, by means of determining whether the GTP-C message is received from the S8 interface, attack prevention processing may be performed only on the GTP-C received by the PGW or the edge node from the S8 interface such that attack prevention efficiency is improved.

Step S403. When the GTP-C message is received from the S8 interface, determine whether a first characteristic parameter of the GTP-C message is valid.

The first characteristic parameter includes at least one of the following parameters the international mobile user identity (that is IMSI) of the user, or an identifier of a message source end of the GTP-C message.

The identifier of the message source end of the GTP-C message refers to information used to indicate an operator to which a terminal source sending the GTP-C message belongs. For example, if the message is sent by the SGW, the GTP-C message is information about an operator to which the SGW belongs.

Further, the message source end of the GTP-C message may be indicated using the source IP address of the SGW, or the PLMN ID of the SGW.

The IMSI is an identity used to uniquely identify a terminal user that sends the GTP-C message using the PGW.

Further, because the GTP-C message directly carries the IMSI, or carries a TEID, the IMSI is carried in the GTP-C message or is obtained using the TEID carried in the GTP-C message.

Optionally, the GTP-C message may include another identity used to uniquely identify the terminal user that sends the GTP-C message using the SGW.

Step S404. If the first characteristic parameter of the GTP-C message is invalid, discard the GTP-C message or return, to the SGW, a GTP-C response message carrying an error code cause value.

The error code cause value is a value used to reflect an invalidity type of the characteristic parameter of the GTP-C message. For example, when an IMSI parameter carried in the GTP-C message is invalid, an error code cause value is carried in the GTP-C response message to indicate that the IMSI parameter is invalid, or when a source IP parameter in the GTP-C message is invalid, another error code cause value may be carried in the GTP-C response message to indicate that the source IP parameter is invalid.

Optionally, if the characteristic parameter of the GTP-C message is valid, in this case, it indicates that the GTP-C message is valid. Therefore, in this case, normal service processing may be continued.

It can be learned that, in the solution in this embodiment, after the PGW or the edge node receives the GTP-C message sent by the SGW, whether the characteristic parameter carried in the GTP-C message is valid is determined when the GTP-C message is received from the S8 interface, and the GTP-C message is discarded or the GTP-C response message carrying the error code cause value is returned to the SGW when the characteristic parameter is invalid such that a hacker can be effectively prevented from attacking the PGW using each attack path, and communication security is improved.

Optionally, in an embodiment of the present disclosure, the GTP-C message further includes the source IP address of the SGW, and the first characteristic parameter includes the identifier of the message source end of the GTP-C message.

The determining whether a first characteristic parameter of the GTP-C message is valid includes determining whether the source IP address belongs to a preset IP address set, and when the source IP address does not belong to the preset IP address set, determining that the identifier is not a valid identifier, or sending the source IP address to an HSS and/or an MME such that the MME and/or the HSS determine/determines whether the source IP address belongs to a preset IP address set, receiving a home operator determining result returned by the MME and/or the HSS, and when the home operator result is that the IP address does not belong to the preset IP address set, determining that the identifier is not a valid identifier.

Optionally, when the GTP-C message is the modify bearer request, and the source IP address belongs to the preset IP address set, it is determined that the identifier is a valid identifier.

Optionally, when the GTP-C message is the create/delete session request, and the source IP address belongs to the preset IP address set, another step for determining whether the GTP-C message is valid continues to be performed.

Optionally, when the GTP-C message is the modify bearer request, and the home operator determining result is that the source IP address belongs to the preset IP address set, it is determined that the source IP address in the GTP-C message is valid.

Optionally, when the GTP-C message is the create/delete session request, and the home operator determining result is that the source IP address belongs to the preset IP address set, another step for determining whether the GTP-C message is valid continues to be performed.

The preset IP address set is an IP address set authorized by a roaming operator permitted by the operator to which the PGW belongs.

Further, the preset IP address set may be pre-configured in the PGW or the edge node.

Further, a list of roaming operators (peer SGW IP addresses or peer PLMN IDs permitted by the operator to which the PGW belongs may be configured in the PGW or the edge node. Then, whether the source IP address is in the list is determined.

Further, the IP address set may be all independent IP addresses such as an IP address 192.168.6.28 and an IP address 192.168.6.78, or may be an IP address segment, for example, 192.168.6.0 is used to indicate an IP address segment from 192.168.6.0 to 192.168.6.255.

Further, the preset IP address set may be pre-configured in the HSS or the MME.

Further, a list of roaming operators (peer PGW IP addresses or peer PLMN IDs) permitted by the operator to which the PGW belongs may be configured in the HSS or the MME, the PGW or the edge node sends the source IP address to the HSS or the MME, and then the HSS or the MME determines whether the source IP address is in the list to obtain a home operator determining result, and returns the home operator determining result to the PGW or the edge node. When the home operator determining result is that the source IP address does not belong to the preset IP address set, it is determined that the source IP address in the GTP-C message is invalid.

It may be understood that the attack prevention method is more flexible by determining, in different manners, whether the source IP address is valid.

Optionally, in an embodiment of the present disclosure, the GTP-C message further includes the PLMN ID of the SGW, and the first characteristic parameter includes the identifier of the message source end of the GTP-C message.

The determining whether a first characteristic parameter of the GTP-C message is valid includes determining whether the PLMN ID belongs to a preset PLMN ID set, and when the PLMN ID does not belong to the preset PLMN ID set, determining that an identifier of the GTP-C message is an invalid identifier, or sending the PLMN ID to the HSS and/or the MME such that the MME and/or the HSS determine/determines whether the PLMN ID belongs to a preset PLMN ID set, receiving a home operator determining result returned by the MME and/or the HSS, and when the home operator result is that the PLMN ID does not belong to the preset PLMN ID set, determining that the identifier is an invalid identifier.

Optionally, when the GTP-C message is the modify bearer request, and the PLMN ID belongs to the preset PLMN ID set, it is determined that the identifier is a valid identifier.

Optionally, when the GTP-C message is the create/delete session request, and the PLMN ID belongs to the preset PLMN ID set, another step for determining whether the GTP-C message is valid continues to be performed.

Optionally, when the GTP-C message is the modify bearer request, and the home operator determining result is that the PLMN ID belongs to the preset PLMN ID set, it is determined that the identifier is a valid identifier.

Optionally, when the GTP-C message is the modify bearer request, and the home operator determining result is that the PLMN ID belongs to the preset PLMN ID set, another step for determining whether the GTP-C message is valid continues to be performed.

Further, the preset PLMN ID set may be pre-configured in the PGW or the edge node.

Further, a list of roaming operators (peer PGW IP addresses or peer PLMN IDs) permitted by the operator to which the PGW belongs may be configured in the HSS or the MME, the PGW or the edge node sends the source IP address to the HSS or the MME, and then the HSS or the MME determines whether the source PLMN ID is in the list to obtain a home operator determining result, and returns the home operator determining result to the PGW or the edge node. When the home operator determining result is that the PLMN ID does not belong to the preset PLMN ID set, it is determined that the identifier is an invalid identifier.

It may be understood that the attack prevention method is more flexible by determining, in different manners, whether the PLMN ID is valid.

Optionally, in an embodiment of the present disclosure, the GTP-C message includes an IP address and the PLMN ID, and the first characteristic parameter is the identifier of the message source end of the GTP-C message.

Determining whether a first characteristic parameter of the GTP-C message is valid includes determining whether the IP address belongs to the preset IP address set and determining whether the PLMN ID belongs to the preset PLMN ID set, and when the source IP address does not belong to the preset IP address set and/or the PLMN ID belongs to the preset PLMN ID set, determining that the identifier is an invalid identifier, or sending the source IP address and the PLMN ID to the HSS such that the HSS determines whether the IP address belongs to the preset IP address set and/or determines whether the PLMN ID belongs to the preset PLMN ID set, receiving a home operator determining result returned by the MME and/or the HSS, and when the home operator determining result is that the source IP address does not belong to the preset IP address set and/or the PLMN ID does not belong to the preset PLMN ID set, determining that the identifier is an invalid identifier, or sending the source IP address and the PLMN ID to the MME such that the HSS determines whether the IP address belongs to the preset IP address set and/or determines whether the PLMN ID belongs to the preset PLMN ID set, receiving a home operator determining result returned by the MME and/or the HSS, and when the home operator determining result is that the source IP address does not belong to the preset IP address set and/or the PLMN ID does not belong to the preset PLMN ID set, determining that the identifier is an invalid identifier.

For example, in an example of the present disclosure, when the GTP-C message is the create/delete session request, whether the source IP address in the GTP-C message is in the foregoing list may be checked.

For example, in another example of the present disclosure, when the GTP-C message is the modify bearer request, whether a mobile country code (MCC)/mobile network code (MNC) of the source IP address and/or a serving network parameter (such as the PLMN ID) in the GTP-C message is in the foregoing list is checked.

For example, in an example of the present disclosure, when the GTP-C message is the create/delete session request, the source IP address of the SGW may be sent to the HSS or the MME.

For example, in another example of the present disclosure, when the GTP-C message is the modify bearer request, an MCC/MNC of the source IP address and/or a serving network parameter (such as the PLMN ID) in the GTP-C message may be sent to the HSS or the MME.

It may be understood that, because the source IP address in the GTP-C message can reflect the operator of the peer SGW, whether the peer SGW is in the list of the permitted roaming operators may be determined using the source IP address in order to determine that the GTP-C message is invalid when the peer SGW is not in the list of the permitted roaming operators, that is, the GTP-C message may be from a hacker attack. In this case, to ensure communication security, the message is discarded, or further, the GTP-C response message carrying the error code may be sent to the SGW.

Optionally, whether the operator to which the SGW belongs is a roaming operator permitted by the PGW may be determined using another parameter that can reflect a network code of the GTP-C message.

Further, an information list of permitted roaming operators may be pre-configured in the PGW or the edge node (GTP-C aware). The information list of the roaming operators includes an IP address of a peer SGW sending the GTP-C message and a PLMN ID of the peer SGW. Then, whether the source IP address or the PLMN ID or both that are in the GTP-C message and that are of the SGW are in the information list of the roaming operators is checked. If the source IP address or the PLMN ID or both of the SGW belong to the information list of the roaming operators, it is determined that the operator to which the SGW belongs is an operator authorized by the PGW, or if the source IP address or the PLMN ID or both of the SGW do not belong to the information list of the roaming operators, it is determined that the operator to which the SGW belongs is not an operator authorized by the PGW, that is, the GTP-C message may be from a hacker attack. In this case, to ensure communication security, the message is discarded, or further, the GTP-C response message carrying the error code may be sent to the SGW.

Alternatively, an information list of permitted roaming operators may be pre-configured in the HSS and/or the MME. The information list of the roaming operators includes an IP address of a peer SGW sending the GTP-C message and a PLMN ID of the peer SGW. Then, the PGW or the edge node (GTP-C aware) sends the source IP address and/or the PLMN ID of the peer SGW to the HSS and/or the MME. The HSS or the MME or both determine whether the source IP address or the PLMN ID or both are in the information list of the roaming operators to obtain a home operator determining result, and return the result to the PGW or the edge node. If the source IP address or the PLMN ID or both of the SGW are in the information list of the roaming operators, it is determined that the operator to which the SGW belongs is an operator authorized by the PGW, or if the source IP address or the PLMN ID or both of the SGW do not belong to the information list of the roaming operators, it is determined that the operator to which the SGW belongs is not an operator authorized by the PGW, that is, the GTP-C message may be from a hacker attack. In this case, to ensure communication security, the message is discarded, or further, the GTP-C response message carrying the error code may be sent to the SGW.

It may be understood that, because the IP address and/or the PLMN ID of the SGW can reflect the operator to which the SGW belongs, whether the operator to which the SGW belongs is a roaming operator permitted by the PGW may be determined using the IP address and/or the PLMN ID of the SGW in order to further determine whether the message is valid.

Optionally, in an embodiment of the present disclosure, the first characteristic parameter includes the IMSI.

The determining whether a first characteristic parameter of the GTP-C message is valid includes determining whether the IMSI is an IMSI authorized by the operator to which the PGW belongs, and when the IMSI is not the IMSI authorized by the operator to which the PGW belongs, determining that the IMSI in the GTP-C message is an invalid IMSI.

Further, the PGW or the edge node checks whether an MCC or an MNC or both in the IMSI are consistent with an MCC and/or an MNC to which the PGW belongs in order to determine whether the IMSI is valid.

Further, a list of MCCs and/or MNCs to which the PGW belong/belongs may be pre-configured in the PGW or the edge node, and then whether the MCC or the MNC or both in the IMSI in the GTP-C message are in the list is checked to determine whether the IMSI is valid.

MCC resources are centrally allocated and managed by the International Telecommunication Union (ITU). A mobile country code uniquely identifies a country to which a mobile subscriber belongs, and includes three digits, which are 460 for China. An MNC is used to identify a mobile network to which a mobile client belongs. For example, MNCs of China Mobile are 00, 02, 04, and 07, MNCs of China Unicom are 01 and 06, and MNCs of China Telecom are 03 and 05.

It may be understood that, because the IMSI is the identity of the terminal user that sends the GTP-C message using the SGW, that is, a message resource that sends the GTP-C message, whether the GTP-C is sent by a valid terminal user can be accurately determined using the IMSI in the GTP-C message to determine validity of the GTP-C message in order to prevent the hacker from launching a malicious attack using GTP-C signaling, and improve communication security.

Optionally, in an embodiment of the present disclosure, the first characteristic parameter includes the IMSI.

Determining whether a first characteristic parameter of the GTP-C message is valid includes determining whether the IMSI has a roaming access permission, and when the IMSI has no roaming access permission, determining that the IMSI in the GTP-C message is an invalid IMSI.

The roaming access permission is an access permission of accessing the PGW by the terminal user of the SGW using the SGW when the SGW and the PGW belong to different operators.

It may be understood that, whether the GTP-C message is valid is determined by further determining whether the IMSI has the roaming access permission in order to further prevent a GTP-C signaling attack, and improve communication security.

Further, in an embodiment of the present disclosure, determining whether the IMSI has a roaming access permission includes determining whether the IMSI belongs to a preset set of IMSIs of users having the roaming access permission, and when the IMSI does not belong to the preset set of the IMSIs of the users having the roaming access permission, determining that the IMSI in the GTP-C message is an invalid IMSI, or sending a roaming access permission determining request to the HSS such that the HSS determines whether the IMSI belongs to a preset set of IMSIs of users having the roaming access permission, receiving a roaming access permission determining result returned by the HSS, and when the roaming access permission determining result is that the IMSI does not belong to the preset set of the IMSIs of the users having the roaming access permission, determining that the IMSI in the GTP-C message is an invalid IMSI, or sending a roaming access permission determining request to the MME such that the MME determines whether the IMSI belongs to a preset set of IMSIs of users having the roaming access permission, receiving a roaming access permission determining result returned by the MME, and when the roaming access permission determining result is that the IMSI does not belong to the preset set of the IMSIs of the users having the roaming access permission, determining that the IMSI in the GTP-C message is an invalid IMSI.

The preset set of the IMSIs of the users having the roaming access permission is a set of IMSIs of terminal users who send the GTP-C message using the SGW and have a right of accessing the PGW when the SGW and the PGW do not belong to a same operator.

Optionally, when the IMSI belongs to the preset set of the IMSIs of the users having the roaming access permission or the roaming access permission determining result is that the IMSI belongs to the preset set of the IMSIs of the users having the roaming access permission, it is determined that the IMSI in the GTP-C message is a valid IMSI.

Further, in an embodiment of the present disclosure, a preset list of user terminals having the roaming access permission may be pre-configured in the PGW. Then, whether a terminal sending the GTP-C message is in the preset list of the user terminals having the roaming access permission is determined, and when the terminal is not in the preset list of the user terminals having the roaming access permission, it is determined that the IMSI in the GTP-C message is an invalid IMSI, and then the GTP-C message is discarded or the GTP-C response message carrying the error code cause value is returned to the SGW.

Further, in another embodiment of the present disclosure, a preset list of user terminals having the roaming access permission (the preset list of the user terminals having the roaming access permission includes IMSIs of all the user terminals) may be deployed in the HSS. The PGW sends a roaming access permission determining request to the HSS, where the roaming access permission determining request includes an IMSI of a terminal sending the GTP-C message, and the determining request message is used to request the HSS to determine whether the terminal corresponding to the IMSI has the roaming access permission. Then, the HSS determines, using the IMSI, whether the terminal is a user terminal having the roaming access permission, and returns a roaming access permission determining result to the PGW such that when the first terminal is not in the preset list of the user terminals having the roaming access permission, the PGW determines that the IMSI in the GTP-C message is an invalid IMSI, and then discards the GTP-C message or returns, to the SGW, the GTP-C response message carrying the error code cause value.

Further, in another embodiment of the present disclosure, a preset list of user terminals having the roaming access permission (the preset list of the user terminals having the roaming access permission includes IMSIs of all the user terminals) may be deployed in the MME. The PGW sends a roaming access permission determining request to the SGW, the SGW sends the roaming access permission determining request to the MME, the roaming access permission determining request includes an IMSI of a terminal, and the roaming access permission determining result is used to request the MME to determine whether the terminal corresponding to the IMSI has the roaming access permission. Then, the MME determines, using the IMSI, whether the terminal is a user terminal having the roaming access permission, and returns a roaming access permission determining result to the PGW using the SGW such that when the terminal is not in the preset list of the user terminals having the roaming access permission, the PGW determines that the IMSI in the GTP-C message is an invalid IMSI, and then discards the GTP-C message or returns, to the SGW, the GTP-C response message carrying the error code cause value.

It may be understood that, by means of determining a roaming access permission of a user in a network of the operator to which the SGW belongs, validity of the GTP-C message may be further determined, and communication security may be ensured.

Optionally, in an embodiment of the present disclosure, the GTP-C message includes a second characteristic parameter, and the method further includes determining whether the second characteristic parameter is consistent with a second characteristic parameter carried in a create session request create session request message received before a terminal corresponding to the GTP-C message is attached, and when the second characteristic parameter is inconsistent with the second characteristic parameter carried in the create session request message received before the terminal is attached, determining that the GTP-C message is invalid, where the second characteristic parameter includes at least one of the following parameters the source IP address, or a TEID.

The source IP address and the TEID are respectively used to identify an identity of a terminal user of the GTP-C message and an operator.

Further, information (the IP address and/or the TEID) about the SGW may be carried in a Sender F-TEID for Control Plane information element.

Optionally, the second characteristic parameter may be the PLMN ID and the TEID.

It may be understood that, by means of further determining consistency between the identity of the terminal user of the GTP-C message and an operator to which the terminal belongs, validity of the GTP-C message may be further determined, and communication security may be ensured.

Optionally, in an embodiment of the present disclosure, before determining whether the second characteristic parameter is consistent with a second characteristic parameter carried in a create session request create session request message received before the terminal is attached, the method further includes determining whether the terminal is attached, and when the terminal is attached, performing the step of determining whether the second characteristic parameter is consistent with a second characteristic parameter carried in a create session request create session request message received before the terminal is attached, or when the terminal is not attached, performing the step of determining whether the IMSI belongs to a preset set of IMSIs of users having the roaming access permission.

Further, the IMSI may be carried in the GTP-C message or may be obtained using the TEID carried in the GTP-C message.

It may be understood that, when the terminal is attached, the IMSI is attached to an operator, and therefore, whether the IMSI is an IMSI authorized by the operator to which the PGW belongs may be determined, to determine whether the GTP-C message is valid. When the first terminal is not attached, the terminal does not belong to any operator, and therefore, in this case, whether the SGW information in the GTP-C message is consistent with SGW information in a create session request message sent by a terminal that is previously attached to the PGW may be determined, to determine validity of the GTP-C message.

Figure 5A:
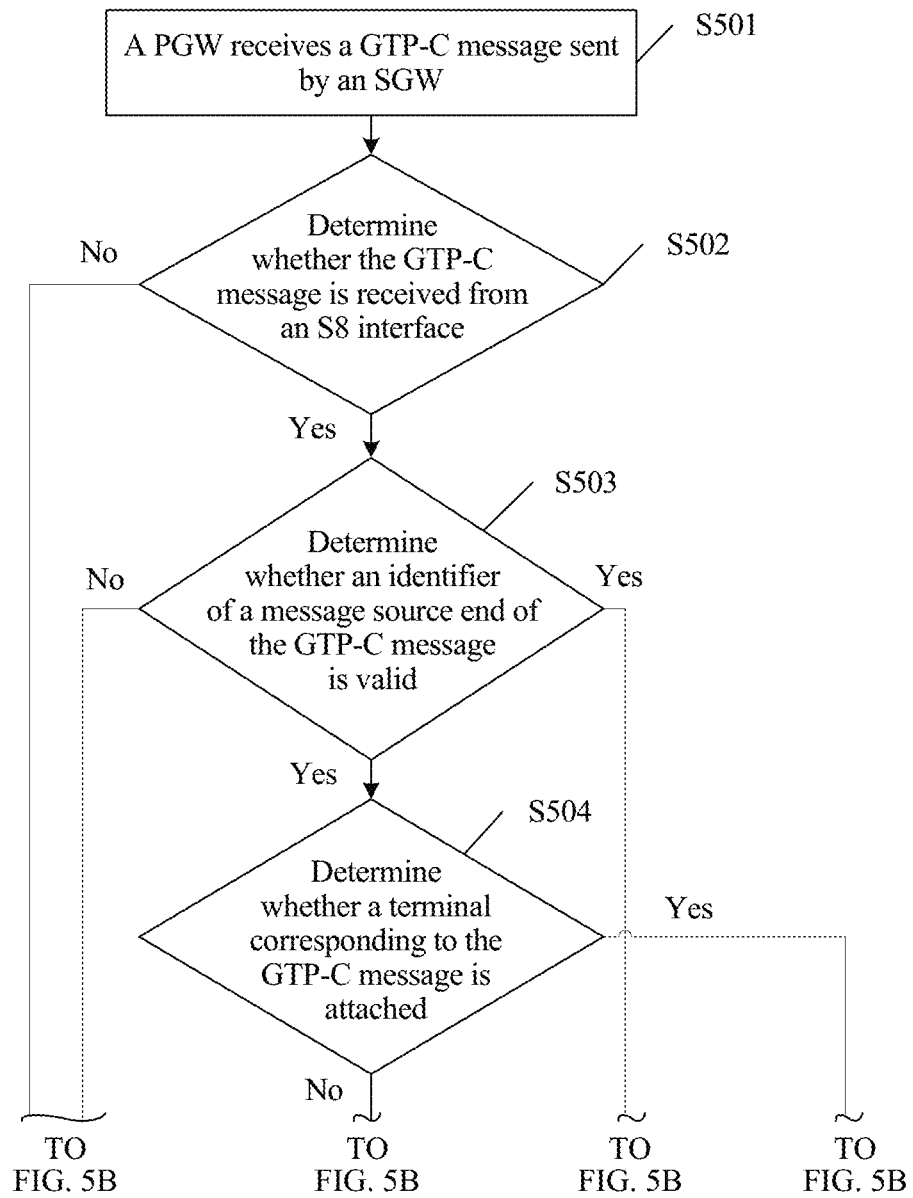
FIG. 5A and FIG. 5B are a schematic flowchart of another signaling attack prevention method according to an embodiment of the present disclosure.
Figure 5B:
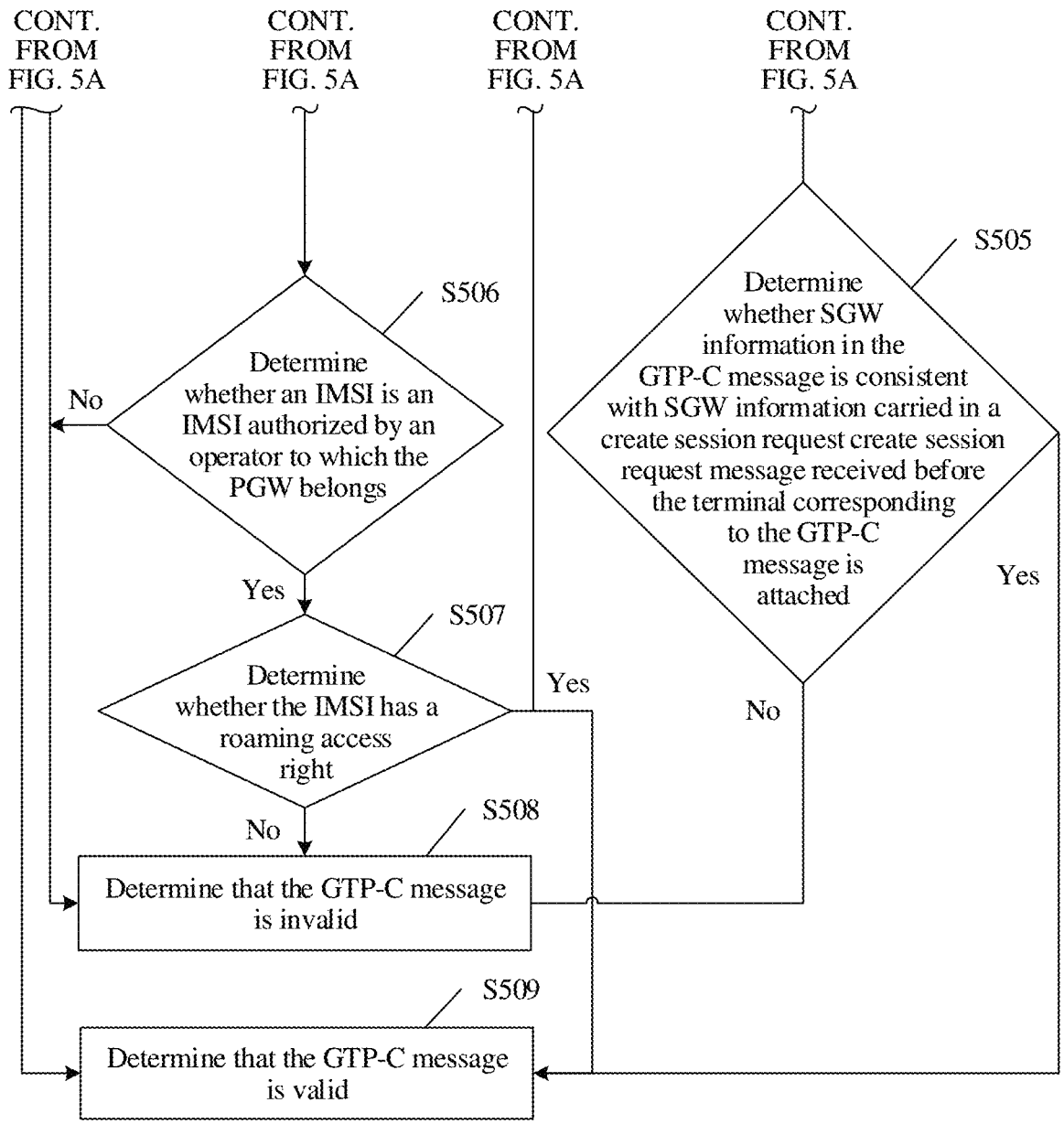

To better understand and implement the foregoing solutions in the embodiments of the present disclosure, the following further describes the embodiments of the present disclosure with reference to FIG. 5A and FIG. 5B.

Referring to FIG. 5A and FIG. 5B, FIG. 5A and FIG. 5B are a schematic flowchart of another signaling attack prevention method according to an embodiment of the present disclosure. In the method shown in FIG. 5A and FIG. 5B, for content that is the same as or similar to that in the method shown in FIG. 4, refer to detailed descriptions in FIG. 4, and details are not described herein again. As shown in FIG. 5A and FIG. 5B, the method may include the following steps.

Step S501. A PGW receives a GTP-C message sent by an SGW.

The GTP-C message includes an IMSI of a first terminal that sends the GTP-C message using the SGW.

Further, the IMSI is included in a TEID in the GTP-C message.

Step S502. Determine whether the GTP-C message is received from an S8 interface.

Optionally, if the GTP-C message is not received from the S8 interface, in this case, step S509 is performed.

Optionally, if the GTP-C message is received from the S8 interface, in this case, step S503 is performed.

Step S503. Determine whether an identifier of a message source end of the GTP-C message is valid.

Optionally, if the identifier of the message source end of the GTP-C message is valid, and the GTP-C message is a modify bearer request message, in this case, step S509 is performed.

Optionally, if the identifier of the message source end of the GTP-C message is valid, and the GTP-C message is a create/delete session request message, in this case, step S504 is performed.

Optionally, if the identifier of the message source end of the GTP-C message is invalid, in this case, step S508 is performed.

Step S504. Determine whether a terminal corresponding to the GTP-C message is attached.

Optionally, if the terminal corresponding to the GTP-C message is attached, in this case, step S505 is performed.

Optionally, if the terminal corresponding to the GTP-C message is not attached, in this case, step S506 is performed.

Step S505. Determine whether SGW information in the GTP-C message is consistent with SGW information carried in a create session request message received before the terminal corresponding to the GTP-C message is attached.

The SGW information may be an IP address and/or a TEID.

Optionally, if the SGW information in the GTP-C message is inconsistent with the SGW information carried in the create session request create session request message received before the terminal corresponding to the GTP-C message is attached, in this case, step S508 is performed.

Optionally, if the SGW information in the GTP-C message is consistent with the SGW information carried in the create session request create session request message received before the terminal corresponding to the GTP-C message is attached, in this case, step S509 is performed.

Step S506. Determine whether an IMSI is an IMSI authorized by an operator to which the PGW belongs.

Optionally, if the IMSI is the IMSI authorized by the operator to which the PGW belongs, in this case, step S507 is performed.

Optionally, if the IMSI is not the IMSI authorized by the operator to which the PGW belongs, in this case, step S508 is performed.

Step S507. Determine whether the IMSI has a roaming access permission.

Optionally, if the IMSI has the roaming access permission, in this case, step S509 is performed.

Optionally, if the IMSI has no roaming access permission, in this case, step S508 is performed.

Step S508. Determine that the GTP-C message is invalid.

In this embodiment of the present disclosure, in this case, the PGW or an edge node (GTP-c aware) discards the GTP-C message or returns a GTP-C response message carrying an error code.

Step S509. Determine that the GTP-C message is valid.

In this embodiment of the present disclosure, in this case, the PGW or the edge node (GTP-c aware) continues normal service processing.

It should be noted that, the foregoing steps S502, S503, S504, S505, and S507 are optional steps, a sequence between step S506 and steps S504 and S505 may be exchanged, that is, step S506 may be performed before steps S504 and S505 are performed, and a sequence between steps S504 and S505 and steps S506 and S507 may be exchanged, that is, steps S506 and S507 may be performed before steps S504 and S505 are performed.

It can be learned that, in the solution in this embodiment, after the PGW or the edge node receives the GTP-C message sent by the SGW, whether the characteristic parameter carried in the GTP-C message is valid is determined when the GTP-C message is received from the S8 interface, and the GTP-C message is discarded or the GTP-C response message carrying the error code cause value is returned to the SGW when the characteristic parameter is invalid such that a hacker can be effectively prevented from attacking the PGW using each attack path, and communication security is improved.

Figure 6:
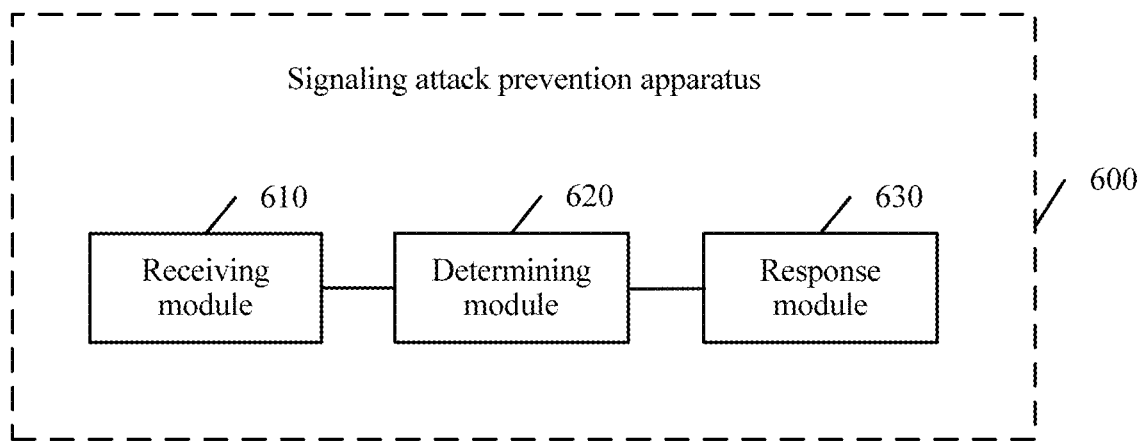
FIG. 6 is a schematic structural diagram of a signaling attack prevention apparatus according to an embodiment of the present disclosure.

Referring to FIG. 6, FIG. 6 is a schematic structural diagram of a signaling attack prevention apparatus 600 according to an embodiment of the present disclosure. The signaling attack prevention apparatus 600 is configured to implement the signaling attack prevention method disclosed in the embodiments of the present disclosure. As shown in FIG. 6, the signaling attack prevention apparatus 600 provided in this embodiment of the present disclosure may include a receiving module 610, a determining module 620, and a response module 630.

The receiving module 610 is configured to receive a GTP-C message sent by an SGW.

Further, the signaling attack prevention apparatus 600 may be a PGW or an edge node. That is, the GTP-C message sent by the SGW may be received by the PGW, or the GTP-C message sent by the SGW may be received by the edge node (GTP-C aware).

Optionally, the edge node may be a firewall that is deployed at a border of an operator network and that is aware of the GTP-C Protocol.

Further, in this embodiment of the present disclosure, the GTP-C message may be a create session request (IMSI, . . . ), a modify bearer request (serving network, . . . ), a delete session request (TEID, . . . ) message, or the like.

Optionally, the GTP-C message includes at least one of the following items, a source IP address of the SGW, a PLMN ID of the SGW, or an IMSI of a user.

The determining module 620 is configured to determine whether the GTP-C message is received from an S8 interface.

In this embodiment of the present disclosure, when attacking a PGW of an operator A using an SGW of an operator B, a hacker sends a GTP-C attack message using the S8 interface. Therefore, to prevent the foregoing attacks, only validity of the GTP-C message received from the S8 interface needs to be determined, and security of a message received from an S5 interface or another security interface does not need to be determined.

Optionally, the GTP-C message further includes a source IP address of the SGW.

That the determining module 620 determines whether the GTP-C message is received from an S8 interface includes determining whether the source IP address and an IP address of a PGW or an edge node that receives the GTP-C message belong to a same network segment, and when the source IP address and the IP address of the PGW or the edge node that receives the GTP-C message do not belong to a same network segment, determining that the GTP-C message is received from the S8 interface, or determining whether the source IP address belongs to an IP address set authorized by an operator to which the PGW or an edge node belongs, and when the source IP address does not belong to the IP address set authorized by the operator to which the PGW or the edge node belongs, determining that the GTP-C message is received from the S8 interface.

Optionally, the IP address set may be stored in the signaling attack prevention apparatus 600.

Further, the IP address set may be stored in the PGW or the edge node.

The determining module 620 is further configured to, when the GTP-C message is received from the S8 interface, determine whether a first characteristic parameter of the GTP-C message is valid, where the first characteristic parameter includes at least one of the following parameters an IMSI of a user, or a message source end of the GTP-C message.

The response module 630 is configured to, if the first characteristic parameter of the GTP-C message is invalid, discard the GTP-C message or return, to the SGW, a GTP-C response message carrying an error code cause value.

Optionally, in an embodiment of the present disclosure, the GTP-C message further includes the source IP address of the SGW, and the first characteristic parameter includes the identifier of the message source end of the GTP-C message.

That the determining module 620 determines whether a first characteristic parameter of the GTP-C message is valid includes determining whether the source IP address belongs to a preset IP address set, and when the source IP address does not belong to the preset IP address set, determining that the identifier is not a valid identifier, or sending the source IP address to an HSS and/or an MME such that the MME and/or the HSS determine/determines whether the source IP address belongs to a preset IP address set, receiving a home operator determining result returned by the MME and/or the HSS, and when the home operator result is that the IP address does not belong to the preset IP address set, determining that the identifier is not a valid identifier.

Optionally, in an embodiment of the present disclosure, the GTP-C message further includes the PLMN ID of the SGW, and the first characteristic parameter includes the identifier of the message source end of the GTP-C message.

That the determining module 620 determines whether a first characteristic parameter of the GTP-C message is valid is further determining whether the PLMN ID belongs to a preset PLMN ID set, and when the PLMN ID does not belong to the preset PLMN ID set, determining that an identifier of the GTP-C message is an invalid identifier, or sending the PLMN ID to the HSS and/or the MME such that the MME and/or the HSS determine/determines whether the PLMN ID belongs to a preset PLMN ID set, receiving a home operator determining result returned by the MME and/or the HSS, and when the home operator result is that the PLMN ID does not belong to the preset PLMN ID set, determining that the identifier is an invalid identifier.

The preset IP address set is an IP address set authorized by a roaming operator permitted by the operator to which the PGW belongs.

The preset PLMN ID set may be pre-configured in the PGW or the edge node.

Further, the preset IP address set may be pre-configured in the PGW or the edge node.

Optionally, in an embodiment of the present disclosure, the GTP-C message further includes the PLMN ID, and the first characteristic parameter is the identifier of the message source end of the GTP-C message.

That the determining module 620 determines whether a first characteristic parameter of the GTP-C message is valid includes determining whether the IP address belongs to the preset IP address set and determining whether the PLMN ID belongs to the preset PLMN ID set, and when the source IP address does not belong to the preset IP address set and/or the PLMN ID belongs to the preset PLMN ID set, determining that the identifier is an invalid identifier, or sending the source IP address and the PLMN ID to the HSS such that the HSS determines whether the IP address belongs to the preset IP address set and/or determines whether the PLMN ID belongs to the preset PLMN ID set, receiving a home operator determining result returned by the MME and/or the HSS, and when the home operator determining result is that the source IP address does not belong to the preset IP address set and/or the PLMN ID does not belong to the preset PLMN ID set, determining that the identifier is an invalid identifier, or sending the source IP address and the PLMN ID to the MME such that the HSS determines whether the IP address belongs to the preset IP address set and/or determines whether the PLMN ID belongs to the preset PLMN ID set, receiving a home operator determining result returned by the MME and/or the HSS, and when the home operator determining result is that the source IP address does not belong to the preset IP address set and/or the PLMN ID does not belong to the preset PLMN ID set, determining that the identifier is an invalid identifier.

Optionally, in an embodiment of the present disclosure, the first characteristic parameter includes the IMSI.

That the determining module 620 determines whether a first characteristic parameter of the GTP-C message is valid includes determining whether the IMSI is an IMSI authorized by the operator to which the PGW belongs, and when the IMSI is not the IMSI authorized by the operator to which the PGW belongs, determining that the IMSI in the GTP-C message is an invalid IMSI.

Optionally, in an embodiment of the present disclosure, the first characteristic parameter includes the IMSI.

That the determining module 620 determines whether a first characteristic parameter of the GTP-C message is valid includes determining whether the IMSI has a roaming access permission, and when the IMSI has no roaming access permission, determining that the IMSI in the GTP-C message is an invalid IMSI.

The IMSI is an identity used to uniquely identify a terminal user that sends the GTP-C message using the PGW.

Further, because the GTP-C message directly carries the IMSI, or carries a TEID, the IMSI is carried in the GTP-C message or is obtained using the TEID carried in the GTP-C message.

Optionally, in an embodiment of the present disclosure, that the determining module 620 determines whether the IMSI has a roaming access permission includes determining whether the IMSI belongs to a preset set of IMSIs of users having the roaming access permission, and when the IMSI does not belong to the preset set of the IMSIs of the users having the roaming access permission, determining that the IMSI in the GTP-C message is an invalid IMSI, or sending a roaming access permission determining request to the HSS such that the HSS determines whether the IMSI belongs to a preset set of IMSIs of users having the roaming access permission, receiving a roaming access permission determining result returned by the HSS, and when the roaming access permission determining result is that the IMSI does not belong to the preset set of the IMSIs of the users having the roaming access permission, determining that the IMSI in the GTP-C message is an invalid IMSI, or sending a roaming access permission determining request to the MME such that the MME determines whether the IMSI belongs to a preset set of IMSIs of users having the roaming access permission, receiving a roaming access permission determining result returned by the MME, and when the roaming access permission determining result is that the IMSI does not belong to the preset set of the IMSIs of the users having the roaming access permission, determining that the IMSI in the GTP-C message is an invalid IMSI.

Optionally, in an embodiment of the present disclosure, the GTP-C message includes a second characteristic parameter, and the determining module 620 is further configured to determine whether the second characteristic parameter is consistent with a second characteristic parameter carried in a create session request create session request message received before the terminal is attached, and when the second characteristic parameter is inconsistent with the second characteristic parameter carried in the create session request message received before the terminal corresponding to the GTP-C message is attached, determine that the GTP-C message is invalid, where the second characteristic parameter includes at least one of the following parameters the source IP address, or a TEID.

Optionally, in an embodiment of the present disclosure, before determining whether the second characteristic parameter is consistent with the second characteristic parameter carried in the create session request create session request message received before the terminal is attached, the method further includes determining whether the terminal is attached, and when the terminal is attached, performing the step of determining whether the second characteristic parameter is consistent with a second characteristic parameter carried in a create session request create session request message received before the terminal is attached, or when the terminal is not attached, performing the step of determining whether the IMSI belongs to a preset set of IMSIs of users having the roaming access permission.

It can be learned that, in the solution in this embodiment, after the signaling attack prevention apparatus 600 (which is the PGW or the edge node) receives the GTP-C message sent by the SGW, whether the characteristic parameter carried in the GTP-C message is valid is determined when the GTP-C message is received from the S8 interface, and the GTP-C message is discarded or the GTP-C response message carrying the error code cause value is returned to the SGW when the characteristic parameter is invalid such that a hacker can be effectively prevented from attacking the PGW using each attack path, and communication security is improved.

In this embodiment, the signaling attack prevention apparatus 600 is presented in a form of a unit. The "unit" herein may refer to an application-specific integrated circuit (ASIC), a processor and a memory that execute one or more software or firmware programs, an integrated logic circuit, and/or another component that can provide the foregoing functions.

It may be understood that functions of the function units of the signaling attack prevention apparatus 600 in this embodiment may be further implemented according to the methods in the foregoing method embodiments. For a specific implementation process, refer to related descriptions in the foregoing method embodiments, and details are not described herein.

Figure 7:
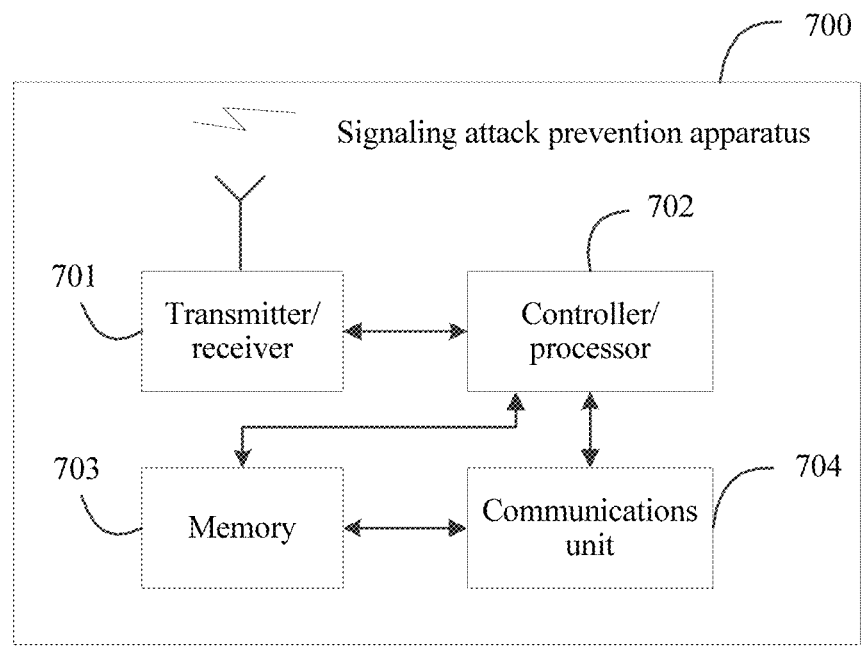
FIG. 7 is a schematic structural diagram of another signaling attack prevention apparatus according to an embodiment of the present disclosure.

Referring to FIG. 7, FIG. 7 is a schematic structural diagram of another signaling attack prevention apparatus 700 according to an embodiment of the present disclosure. As shown in FIG. 7, the signaling attack prevention apparatus 700 includes a transmitter/receiver 701 and a processor 702. The processor 702 may also be a controller, and is indicated as a "controller/processor 702" in FIG. 7. The transmitter/receiver 701 is configured to support the signaling attack prevention apparatus 700 (which may be further a PGW or an edge node) in sending/receiving information to/from the SGW in the foregoing embodiment, and support the PGW in performing radio communication with another device. The processor 702 executes various functions used to communicate with the signaling attack prevention apparatus 700. On an uplink, an uplink signal from the SGW is received using an antenna, is demodulated (for example, a high frequency signal is demodulated into a baseband signal) by the receiver 701, and is then processed by the processor 702 to restore service data and signaling information sent to the signaling attack prevention apparatus 700. On a downlink, the service data and the signaling message are processed by the processor 702, and are modulated (for example, a baseband signal is modulated into a high frequency signal) by the transmitter 701 to generate a downlink signal, and the downlink signal is transmitted to the SGW using the antenna. It should be noted that the foregoing demodulation or modulation function may be implemented by the processor 702. For example, the processor 702 is further configured to perform corresponding steps in the method embodiments, and/or another process in the technical solution described in this embodiment of the present disclosure.

Further, the signaling attack prevention apparatus 700 may further include a memory 703, and the memory 703 is configured to store program code and data of the signaling attack prevention apparatus 700. In addition, the signaling attack prevention apparatus 700 may further include a communications unit 704. The communications unit 704 is configured to support the signaling attack prevention apparatus in communicating with another network entity (for example, a network device in a core network). For example, in a long term evolution (LTE) system, the communications unit 704 may be an S1-MME interface, and be configured to support the signaling attack prevention apparatus in communicating with an MME.

It may be understood that, FIG. 7 shows merely a simplified design of the signaling attack prevention apparatus 700. In actual application, the signaling attack prevention apparatus 700 may include any quantities of transmitters, receivers, processors, controllers, memories, and communications units. All signaling attack prevention apparatuses that can implement the embodiments of the present disclosure fall within the protection scope of the embodiments of the present disclosure.

An embodiment of the present disclosure further provides a computer storage medium. The computer storage medium may store a program, and when the program is executed, some or all steps of any signaling attack prevention method in the foregoing method embodiments are performed.

It should be noted that, to make the description brief, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

In the several embodiments provided in the present disclosure, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a read-only memory (ROM), a random access memory (RAM), a removable hard disk, a magnetic disk, or an optical disc.

What is claimed is:

1. A signaling attack prevention method, comprising:
receiving a general packet radio service (GPRS) Tunneling Protocol (GTP-C) message from a serving gateway (SGW), wherein the GTP-C message comprises a source Internet Protocol (IP) address of the SGW;
determining whether the GTP-C message is received from an eighth data interface (S8);
determining whether a first characteristic parameter of the GTP-C message is valid when the GTP-C message is received from the S8, wherein the first characteristic parameter comprises at least one of an international mobile subscriber identity (IMSI) of a user or an identifier of a message source end of the GTP-C message, and wherein determining whether the first characteristic parameter of the GTP-C message is valid comprises:
determining the first characteristic parameter comprises the identifier of the message source end of the GTP-C message;
determining whether the source IP address of the SGW belongs to a preset IP address set;
determining that the identifier of the message source end of the GTP-C message is not a valid identifier when the source IP address of the SGW does not belong to the preset IP address set;
sending the source IP address of the SGW to a home subscriber server (HSS) to enable the HSS to determine whether the source IP address of the SGW belongs to the preset IP address set;
receiving a home operator determining result from the HSS; and
determining that the identifier of the message source end of the GTP-C message is not the valid identifier when the home operator determining result from the HSS is that the source IP address of the SGW does not belong to the preset IP address set; and
discarding the GTP-C message or returning, to the SGW, a GTP-C response message carrying an error code cause value when the first characteristic parameter of the GTP-C message is invalid.

2. The signaling attack prevention method of claim 1, wherein the GTP-C message further comprises a public land mobile network (PLMN) identifier of the SGW, and wherein determining whether the first characteristic parameter of the GTP-C message is valid further comprises:
determining whether the PLMN identifier of the SGW belongs to a preset PLMN identifier set;
determining that the identifier of the message source end of the GTP-C message is an invalid identifier when the PLMN identifier of the SGW does not belong to the preset PLMN identifier set;
sending the PLMN identifier of the SGW to the HSS to enable the HSS to determine whether the PLMN identifier of the SGW belongs to the preset PLMN identifier set;
receiving a home operator determining result from the HSS; and
determining that the identifier of the message source end of the GTP-C message is the invalid identifier when the home operator determining result is that the PLMN identifier of the SGW does not belong to the preset PLMN identifier set.

3. The signaling attack prevention method of claim 1, wherein determining whether the first characteristic parameter of the GTP-C message is valid comprises:
determining whether the source IP address of the SGW belongs to the preset IP address set;
determining that the identifier of the message source end of the GTP-C message is not a valid identifier when the source IP address of the SGW does not belong to the preset IP address set;
sending the source IP address of the SGW to a mobility management entity (MME) to enable the MME to determine whether the source IP address of the SGW belongs to the preset IP address set;
receiving a home operator determining result from the MME; and
determining that the identifier of the message source end of the GTP-C message is not the valid identifier when the home operator determining result from the MIME is that the source IP address of the SGW does not belong to the preset IP address set.

4. The signaling attack prevention method of claim 1, wherein the GTP-C message further comprises a public land mobile network (PLMN) identifier of the SGW, and wherein determining whether the first characteristic parameter of the GTP-C message is valid comprises:
determining whether the PLMN identifier of the SGW belongs to the preset PLMN identifier set;
determining that the identifier of the message source end of the GTP-C message is an invalid identifier when the PLMN identifier of the SGW does not belong to the preset PLMN identifier set;
sending the PLMN identifier of the SGW to a mobility management entity (MME) to enable the MIME to determine whether the PLMN identifier of the SGW belongs to the preset PLMN identifier set;
receiving a home operator determining result from the MME; and
determining that the identifier of the message source end of the GTP-C message is the invalid identifier when the home operator determining result from the MME is that the PLMN identifier of the SGW does not belong to the preset PLMN identifier set.

5. A signaling attack prevention apparatus, comprising:
a receiver configured to receive a general packet radio service (GPRS) Tunneling Protocol (GTP-C) message from a serving gateway (SGW), wherein the GTP-C message comprises a source Internet Protocol (IP) address of the SGW;
a processor coupled to the receiver and configured to:
determine whether the GTP-C message is received from an eighth data interface (S8);
determine whether a first characteristic parameter of the GTP-C message is valid when the GTP-C message is received from the S8, wherein the first characteristic parameter comprises at least one of an international mobile subscriber identity (IMSI) of a user or an identifier of a message source end of the GTP-C message, and wherein the processor is configured to determine whether the first characteristic parameter of the GTP-C message is valid by:
    determining the first characteristic parameter comprises the identifier of the message source end of the GTP-C message;
    determining whether the source IP address belongs to a preset IP address set;
    determining that the identifier of the message source end of the GTP-C message is not a valid identifier when the source IP address does not belong to the preset IP address set;
    sending the source IP address to a home subscriber server (HSS) to enable the HSS to determine whether the source IP address belongs to the preset IP address set;
    receiving a home operator determining result from the HSS; and
    determining that the identifier of the message source end of the GTP-C message is not the valid identifier when the home operator determining result is that the IP address does not belong to the preset IP address set; and
  discard the GTP-C message or return, to the SGW, a GTP-C response message carrying an error code cause value when the first characteristic parameter of the GTP-C message is invalid.

6. The signaling attack prevention apparatus of claim 5, wherein the GTP-C message further comprises a public land mobile network (PLMN) identifier of the SGW, and wherein in a manner of determining whether the first characteristic parameter of the GTP-C message is valid, the processor is further configured to:
  determine whether the PLMN identifier belongs to the preset PLMN identifier set;
  determine that the identifier of the message source end of the GTP-C message is an invalid identifier when the PLMN identifier of the SGW does not belong to the preset PLMN identifier set;
  send the PLMN identifier to the HSS to enable the HSS to determine whether the PLMN identifier belongs to the preset PLMN identifier set;
  receive a home operator determining result from the HSS; and
  determine that the identifier of the message source end of the GTP-C message is the invalid identifier when the home operator determining result from the HSS is that the PLMN identifier does not belong to the preset PLMN identifier set.

7. The signaling attack prevention apparatus of claim 5, wherein in a manner of determining whether the first characteristic parameter of the GTP-C message is valid, the processor is further configured to:
  determine whether the source IP address belongs to the preset IP address set; determine that the identifier of the message source end of the GTP-C message is not a valid identifier when the source IP address does not belong to the preset IP address set;
  send the source IP address to a mobility management entity (MME) to enable the MME to determine whether the source IP address belongs to the preset IP address set; receive a home operator determining result from the MME; and
  determine that the identifier of the message source end of the GTP-C message is not the valid identifier when the home operator determining result from the MME is that the IP address does not belong to the preset IP address set.

8. The signaling attack prevention apparatus of claim 5, wherein the GTP-C message further comprises a public land mobile network (PLMN) identifier of the SGW, and wherein in a manner of determining whether the first characteristic parameter of the GTP-C message is valid, the processor is further configured to:
  determine whether the PLMN identifier belongs to the preset PLMN identifier set;
  determine that the identifier of the message source end of the GTP-C message is an invalid identifier when the PLMN identifier does not belong to the preset PLMN identifier set;
  send the PLMN identifier to a mobility management entity (MME) to enable the MME to determine whether the PLMN identifier belongs to the preset PLMN identifier set;
  receive a home operator determining result from the MME; and
  determine that the identifier of the message source end of the GTP-C message is the invalid identifier when the home operator determining result from the MME is that the PLMN identifier does not belong to the preset PLMN identifier set.

9. A computer program product comprising computer-executable instructions stored on a non-transitory computer-readable medium that, when executed by a processor, cause a signaling attack prevention apparatus to:
  receive a general packet radio service (GPRS) Tunneling Protocol (GTP-C) message from a serving gateway (SGW), wherein the GTP-C message comprises a source Internet Protocol (IP) address of the SGW;
  determine whether the GTP-C message is received from an eighth data interface (S8);
  determine whether a first characteristic parameter of the GTP-C message is valid when the GTP-C message is received from the S8, wherein the first characteristic parameter comprises at least one of an international mobile subscriber identity (IMSI) of a user or an identifier of a message source end of the GTP-C message, and wherein determining whether the first characteristic parameter of the GTP-C message is valid comprises:
    determining the first characteristic parameter comprises the identifier of the message source end;
    determining whether the source IP address belongs to a preset IP address set;
    determining that the identifier of the message source end of the GTP-C message is not a valid identifier when the source IP address does not belong to the preset IP address set;
    sending the source IP address to a home subscriber server (HSS) to enable the HSS to determine whether the source IP address belongs to the preset IP address set;
    receiving a home operator determining result from the HSS; and
    determining that the identifier of the message source end of the GTP-C message is not the valid identifier when the home operator determining result from the HSS is that the source IP address does not belong to the preset IP address set; and discard the GTP-C message or return, to the SGW, a GTP-C response message carrying an error code cause value when the first characteristic parameter of the GTP-C message is invalid.

10. The computer program product of claim 9, wherein the GTP-C message further comprises a public land mobile network (PLMN) identifier of the SGW, and wherein in a manner of determining whether the first characteristic parameter of the GTP-C message is valid, the computer-executable instructions further cause the signaling attack prevention apparatus to be configured to:
determine whether the PLMN identifier belongs to a preset PLMN identifier set;
determine that the identifier of the message source end of the GTP-C message is an invalid identifier when the PLMN identifier does not belong to the preset PLMN identifier set;
send the PLMN identifier to the HSS to enable the HSS to determine whether the PLMN identifier belongs to the preset PLMN identifier set;
receive a home operator determining result from the HSS; and
determine that the identifier of the message source end of the GTP-C message is the invalid identifier when the home operator determining result from the HSS is that the PLMN identifier does not belong to the preset PLMN identifier set.

11. The computer program product of claim 9, wherein in a manner of determining whether the first characteristic parameter of the GTP-C message is valid, the computer-executable instructions further cause the signaling attack prevention apparatus to be configured to:
determine whether the source IP address belongs to the preset IP address set;
determine that the identifier of the message source end of the GTP-C message is not a valid identifier when the source IP address does not belong to the preset IP address set;
send the source IP address to a mobility management entity (MME) to enable the MME to determine whether the source IP address belongs to the preset IP address set;
receive a home operator determining result from the MME; and
determine that the identifier of the message source end of the GTP-C message is not the valid identifier when the home operator determining result from the MME is that the IP address does not belong to the preset IP address set.

12. The computer program product of claim 9, wherein the GTP-C message further comprises a public land mobile network (PLMN) identifier of the SGW, and wherein in a manner of determining whether the first characteristic parameter of the GTP-C message is valid, the computer-executable instructions further cause the signaling attack prevention apparatus to be configured to:
determine whether the PLMN identifier belongs to the preset PLMN identifier set;
determine that the identifier of the message source end of the GTP-C message is an invalid identifier when the PLMN identifier does not belong to the preset PLMN identifier set;
send the PLMN identifier to a mobility management entity (MME) to enable the MME to determine whether the PLMN identifier belongs to the preset PLMN identifier set;
receive a home operator determining result from the MME; and
determine that the identifier of the message source end of the GTP-C message is the invalid identifier when the home operator determining result from the MME is that the PLMN identifier does not belong to the preset PLMN identifier set.

* * * * *

UNITED STATES PATENT AND TRADEMARK OFFICE
CERTIFICATE OF CORRECTION

PATENT NO. : 10,972,917 B2
APPLICATION NO. : 16/289106
DATED : April 6, 2021
INVENTOR(S) : Chengdong He Page 1 of 1

It is certified that error appears in the above-identified patent and that said Letters Patent is hereby corrected as shown below:

In the Claims

Claim 3, Column 24, Line 29: "result from the MIME" should read "result from the MME"

Claim 4, Column 24, Line 44: "to enable the MIME" should read "to enable the MME"

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*